J. C. LINCOLN.
DYNAMO ELECTRIC MACHINE STRUCTURE.
APPLICATION FILED JAN. 30, 1911.
1,115,947.
Patented Nov. 3, 1914.
2 SHEETS—SHEET 1.
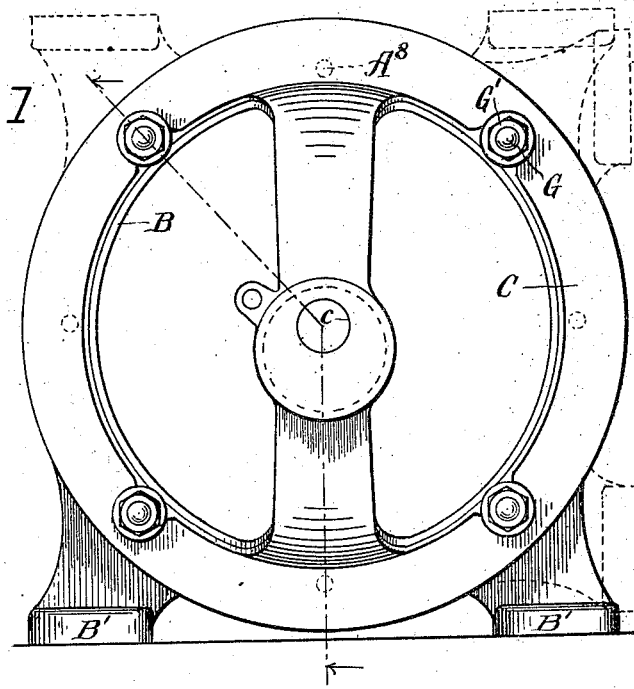
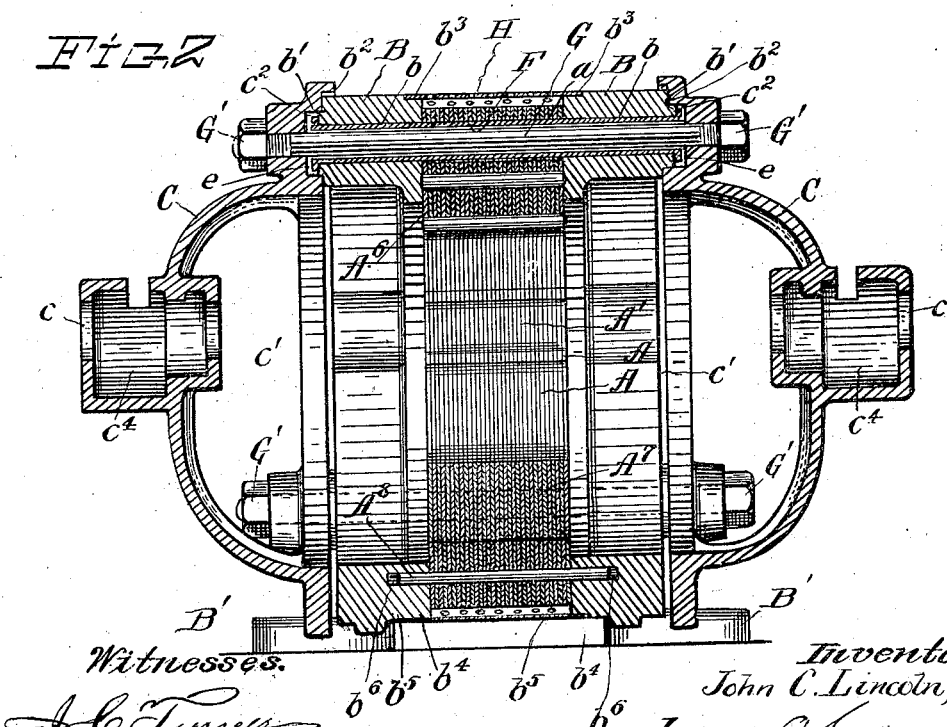
Witnesses.
Inventor:
John C. Lincoln,
by A. C. Merkel,
Attorney J. C. LINCOLN.
DYNAMO ELECTRIC MACHINE STRUCTURE.
APPLICATION FILED JAN. 30, 1911.
1,115,947.
Patented Nov. 3, 1914.
2 SHEETS—SHEET 2.
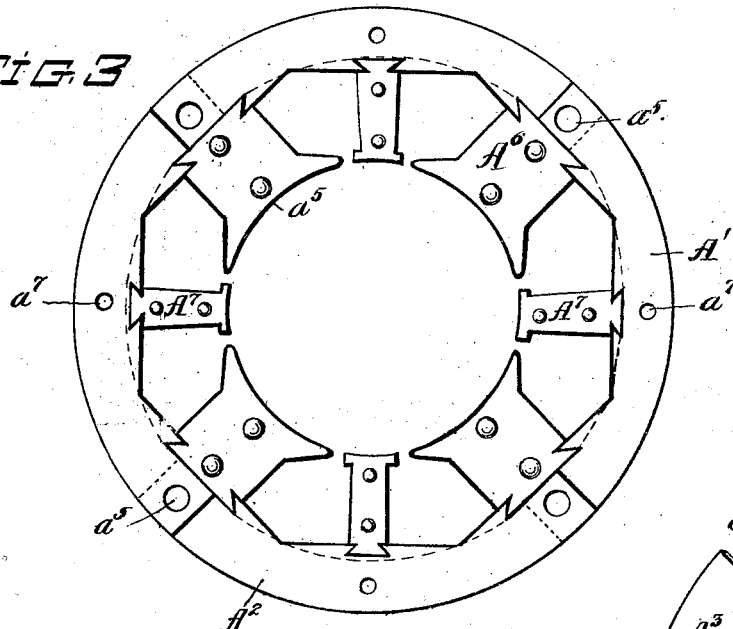
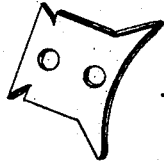
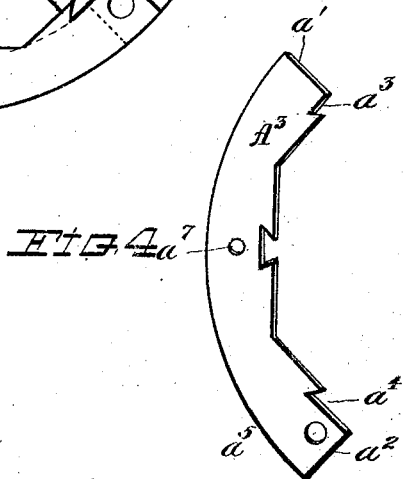
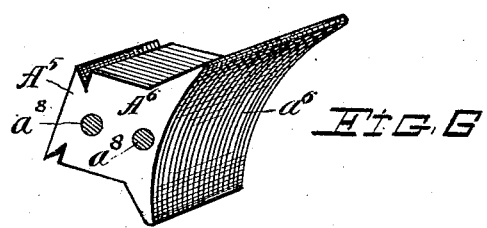
Witnesses.
Inventor.
John C. Lincoln,
by N. E. Merkel,
Attorney.

UNITED STATES PATENT OFFICE.

JOHN C. LINCOLN, OF CLEVELAND, OHIO, ASSIGNOR TO THE LINCOLN ELECTRIC COMPANY, OF CLEVELAND, OHIO, A CORPORATION OF OHIO.

DYNAMO-ELECTRIC-MACHINE STRUCTURE.

1,115,947.　　　　Specification of Letters Patent.　　Patented Nov. 3, 1914.

Application filed January 30, 1911. Serial No. 605,375.

*To all whom it may concern:*

Be it known that I, JOHN C. LINCOLN, a citizen of the United States, resident of Cleveland, county of Cuyahoga, and State of Ohio, have invented a new and useful Improvement in Dynamo-Electric-Machine Structures, of which the following is a specification, the principle of the invention being herein explained and the best mode in which I have contemplated applying that principle, so as to distinguish it from other inventions.

My invention relates to dynamo electric machine structures adapted for use in either generators or motors, and particularly to the frame and field construction, its object being to provide an arrangement whereby such frame and field structure may be economically built up and readily assembled or disassembled.

The said invention consists of means hereinafter fully described and particularly set forth in the claims.

The annexed drawings and the following description set forth in detail certain means embodying my invention, the disclosed means, however, constituting but one of various mechanical forms in which the principle of the invention may be applied.

In said annexed drawings:—Figure 1 is an end elevation of the frame and field of a dynamo electric machine structure embodying my invention. Fig. 2 is a section taken upon the plane indicated by line II—II in Fig. 1. Fig. 3 is an end elevation of the field. Fig. 4 is a perspective view of a detail portion of the annular member of said field. Fig. 5 is a perspective view of a detail portion of one of the pole elements of said field. Fig. 6 is a perspective view of one of said pole elements.

The structure as illustrated embodies a laminated field structure A of circular outer contour, the details of the laminated construction of which will be further hereinafter described. Near the outer edge of this central field structure A, passing therethrough longitudinally, with their axes parallel with and equidistantly removed from the axis of said structure, are four cylindrical apertures $a$. Embracing member A laterally, and having an outer cylindrical contour, are two symmetrical frame members B B, of equal outer diameter, but of greater outer diameter than the outer diameter of member A, as shown in Fig. 2. Each of these frame members B B is provided with four cylindrical apertures $b$ $b$ which register with the apertures $a$, are coaxial therewith, and of equal interior diameter.

Cast upon the lower side portions of the members B B are feet B' B', two feet being cast upon each member, the four feet thus formed forming the support for the entire structure.

The outer face of each member B is formed with four cylindrical bosses $b'$ $b'$ surrounding the apertures $b$ $b$, whereby shoulders $b^2$ $b^2$ are formed.

Mounted upon the outer ends of members B B are end yokes C C which form the end of the frame structure, and are provided with the bearings $c$ $c$ for the armature spindle and oil wells $c^4$ $c^4$. The inner faces of the yokes are formed with four cylindrical recesses $c^2$ $c^2$ equidistant from the axis of member A and having their axes separated from each other in an angular direction by an arc of 90°, having an interior diameter equal to the outer diameter of the bosses $b'$, and being arranged so as to register with and receive the latter. The depth of the recesses, however, is greater than the depth of the bosses, as shown, whereby a free interior space $e$ is formed between each boss and the bottom of its corresponding recess. These bosses and recesses form the only surfaces of the yokes and members B B which are in contact, and may therefore be formed by means of a drill press, eliminating all lathe work in connection with fitting their parts. The remaining portions of the adjacent surfaces of members B B and C C are separated as shown at C' C'.

Passing through each series of registering apertures $a$ and $b$ of the field member A and frame members B B, is a tubular rivet F having an outer diameter substantially equal to the inner diameter of said apertures and having its ends riveted or outwardly upset, as shown, the upset riveted portions lying in the free spaces $e$ $e$, as shown in Fig. 2. Passing through the yokes C C, and through the tubular rivets, are four bolts G having their outer ends threaded to receive nuts G' G'. These bolts secure the yokes C C to the riveted structures consisting of members A and members B B, to each other, as will be readily understood. The inner diameter of the rivets is made less than the outer diameter of the bolts, so as to permit the latter to enter and slide through them freely.

It will be seen from the structure as above described, that the end yokes may be readily dismounted from the interior frame structure consisting of the field member A and frame members B B. The latter being provided with feet B' B', it will be seen that these yokes may be removed without disturbing the position of the interior structure.

By providing the free spaces $e$ $e$ formed by the recesses $c^2$ and bosses $b'$, it will be seen that the shoulders $b^2$ may be readily brought into close and intimate contact with the yokes, and the structure therefore properly fitted, without interference of the upset portion $c^2$ of the rivets. It will also be seen that the diameter and thickness of such upset portions may vary considerably without interfering with the proper assembling of these parts.

The outer cylindrical surface and inner face of each member B is intersected by an annular groove $b^3$, preferably cast in the said members, and seated in these grooves, extending from one to the other, is a cover member H in the form of a band, whose outer diameter is equal to that of the outer members B B. This band therefore imparts a continuity to the outer surface of the interior portion of the structure which eliminates ridges or shoulders, and in addition enhances the exterior appearance of the machine. As illustrated, this band may be perforated in order to allow for ventilation, as will be readily understood, and is secured in place in any suitable manner, the joint formed by its abutting ends being preferably located at the lower part of the machine.

The interior or central field member A is composed of a plurality of laterally adjacent and symmetrical laminations. Fig. 3, which together form an outer annular field member A'. Each such lamination consists of a ring $A^2$ which itself is composed of four segments $A^3$, all symmetrical in shape. The ends $a'$ and $a^2$ of each segment are made perpendicular to their outer circumferential surfaces, and are intersected by undercut incisions $a^3$ and $a^4$, these incisions also intersecting the inner edges of the segments, as shown in Fig. 4. The incisions $a^3$, however, are of less length than the incisions $a^4$, but the corresponding incisions of all the segments are of equal length. When these segments are assembled to form a complete ring, the ends $a'$ are caused to abut the ends $a^2$, so as to bring an incision of greater length in juxtaposition to an incision of lesser length. These two incisions jointly form a dove-tail mortise of a width equal to the thickness of the lamination. These segments, however, are arranged in succeeding laminations in the reverse order with reference to the location of the incisions, so as to stagger the joints formed by the ends $a'$ and $a^2$ in adjacent rings or laminations, as shown in dotted lines in Fig. 3. Formed in the end of the segments adjacent to the incisions $a^4$, are circular holes $a^5$, which when the rings are assembled, are caused to register with each other to form the cylindrical apertures $a$ adapted to receive the rivets F, which hold the laminations together to form the complete annular element A' of the field member A, the short dove-tail mortises in each lamination all registering with each other to form a plurality of long mortises equal in width to the width of the element A'. Each mortise receives a dove-tail tenon $A^5$ formed upon the outer end of a pole element $A^6$, which projects inwardly and radially, and is formed with the usual inner cylindrical surface $a^6$. Additional pole pieces $A^7$ are secured midway between the pole pieces $A^6$ to the element A' in the structure illustrated, by an ordinary dove-tail joint. It will be observed that in addition to being held together by the rivets F, the laminated rings form a very compact and secure structure, by reason of the staggering of the joints. Additional registering holes $a^7$ are formed at equidistant intervals, for the reception of four rods $A^8$, Fig. 2, whose ends are loosely seated in recesses $b^4$ $b^4$ intersecting the inner faces of the members B B, and which aid in positioning the member A with reference to the members B B when these parts are being assembled.

The pole pieces $A^6$, in the structure shown, are formed of a multiplicity of laminations such as are illustrated in Fig. 5, are assembled prior to their insertion in the dove-tail grooves, and secured to each other by means of rivets $a^8$ $a^8$, as shown in Fig. 6. The pole pieces $A^7$ are formed in a similar manner, and assembled prior to their insertion. The circular opening formed by the flanges $b^5$ $b^5$ is made slightly greater in diameter than the diameter of a circle having its center upon the axis of the member A and passing through the radially outermost points of the dove-tail grooves for receiving the pole pieces $A^6$ and $A^7$. These grooves are equidistantly removed from said axis, so that all of said outermost points fall upon the circumference of such circle, as shown in dotted lines in Fig. 3. By means of this construction, therefore, it will be seen that the pole pieces may be slipped into place after the members A and B B have been assembled and riveted to each other by means of the tubular rivets F. Similarly, these pole pieces may be removed without disassembling the parts just mentioned, thereby contributing to the ease and facility of repair or replacing of parts, it being only necessary to remove the end yokes C C when it is desired to remove these pole pieces.

By placing the axes of the bosses $b'$ 90° from each other, the frame members B B may be placed so as to bring the feet in a longitudinal position, as shown in Fig. 1, and be there supported upon a floor; placed in a position in which they are vertical, as shown in dotted lines in Fig. 1, whereby the structure may be fastened to a perpendicular wall; or placed horizontally above, as also shown in dotted lines in said figure, whereby the machine may be fastened to a ceiling, all without disturbing the position of the yokes C C and hence the position of the oil wells $c^3$, it being understood that it is necessary to always maintain these wells in one given position to prevent the oil from being discharged therefrom.

Having fully described my invention, what I claim and desire to secure by Letters Patent is:—

1. In a dynamo electric machine structure, the combination of a central field member provided with a plurality of longitudinal cylindrical openings passing therethrough and having their axes parallel to the axis of said member; two frame members embracing said field member laterally and provided with similar apertures passing therethrough and registering with the apertures in said field member; two end yokes mounted upon the outer ends of said frame members respectively; the outer faces of said frame members being formed with cylindrical bosses surrounding said openings; the inner faces of said yokes being provided with a similar number of cylindrical recesses adapted to receive said bosses, said recesses being of greater depth than the latter; tubular rivets passing through said registering cylindrical openings and upset at their ends to secure said central members and frame members to each other; and bolts passing through said yokes and registering apertures for securing the yokes to said frame members.

2. In a dynamo electric machine structure, the combination of a central field member provided with a plurality of longitudinal cylindrical openings passing therethrough and having their axes parallel to the axis of said member; two frame members embracing said field member laterally, provided with similar apertures passing therethrough registering with the apertures in said field member, and with supporting feet; two end yokes mounted upon the outer ends of said frame members respectively; the outer faces of said frame members being formed with cylindrical bosses surrounding said openings; the inner faces of said yokes being provided with a similar number of cylindrical recesses each being of greater depth than the latter; tubular rivets passing through said registering cylindrical openings and upset at their ends to secure said central members and frame members to each other; bolts passing through said yokes and registering apertures for securing the yokes to said frame members; and suitable bearings for the armature shaft formed in said yokes.

Signed by me, this 25th day of January, 1911.

JOHN C. LINCOLN.

Attested by—
A. E. MERKEL,
J. G. MCMANNIS.